(12) United States Patent
Nakano et al.

(10) Patent No.: US 7,647,646 B2
(45) Date of Patent: Jan. 12, 2010

(54) INFORMATION INPUT/OUTPUT SYSTEM, KEY MANAGEMENT DEVICE, AND USER DEVICE

(75) Inventors: Toshihisa Nakano, Neyagawa (JP); Motoji Ohmori, Hirakata (JP); Makoto Tatebayashi, Takarazuka (JP); Hideshi Ishihara, Katano (JP)

(73) Assignee: Panasonic Corporation, Osaka (JP)

( * ) Notice: Subject to any disclaimer, the term of this patent is extended or adjusted under 35 U.S.C. 154(b) by 580 days.

(21) Appl. No.: 10/414,002

(22) Filed: Apr. 16, 2003

(65) Prior Publication Data

US 2003/0221097 A1 Nov. 27, 2003

(30) Foreign Application Priority Data

Apr. 17, 2002 (JP) ............................. 2002-115328
May 9, 2002 (JP) ............................. 2002-134646

(51) Int. Cl.
*H04L 9/14* (2006.01)
(52) U.S. Cl. ............................. 726/29; 726/26; 726/27; 380/281; 380/282
(58) Field of Classification Search ................ 380/281, 380/282, 284, 285; 713/158; 726/26, 27, 726/29
See application file for complete search history.

(56) References Cited

U.S. PATENT DOCUMENTS

| | | | |
|---|---|---|---|
| 5,392,351 A | 2/1995 | Hasebe et al. | |
| 5,857,021 A | 1/1999 | Kataoka et al. | |
| 5,949,877 A * | 9/1999 | Traw et al. | ................... 713/171 |
| 6,487,658 B1 * | 11/2002 | Micali | ......................... 713/158 |
| 2002/0034302 A1 * | 3/2002 | Moriai et al. | ................ 380/270 |
| 2002/0035492 A1 * | 3/2002 | Nonaka | ......................... 705/5 |
| 2002/0099822 A1 * | 7/2002 | Rubin et al. | ................. 709/225 |
| 2002/0152387 A1 * | 10/2002 | Asano | ......................... 713/176 |
| 2002/0184492 A1 * | 12/2002 | Hori et al. | .................... 713/158 |

FOREIGN PATENT DOCUMENTS

| | | |
|---|---|---|
| EP | 1 069 491 | 1/2001 |
| JP | 9-134311 | 5/1997 |
| JP | 3073590 | 6/2000 |
| JP | 2000-357127 | 12/2000 |
| WO | 01/86654 | 11/2001 |

\* cited by examiner

*Primary Examiner*—Kimyen Vu
*Assistant Examiner*—Edward Zee
(74) *Attorney, Agent, or Firm*—Wenderoth, Lind & Ponack L.L.P.

(57) ABSTRACT

In an information input/output system, a user device inputs and outputs information to and from external sources including a key management device. The system includes the key management device that securely outputs invalid-device information specifying an invalid device unit that has been made invalid for use, and the user device that includes an input/output unit and a host unit. Via the input/output unit, input and output of information is enabled between the host unit and the external sources. The host unit securely receives, via the input/output unit, the invalid-device information outputted by the key management device and judges whether or not the input/output unit is an invalid device unit by referring to the received invalid-device information. When judging, that the input/output unit is an invalid device, the host unit thereafter prohibits input and output via the input/output unit. Due to this construction, the host unit can correctly judge whether or not the input/output unit is an invalid device unit.

5 Claims, 9 Drawing Sheets

INFORMATION INPUT/OUTPUT SYSTEM, KEY MANAGEMENT DEVICE, AND USER DEVICE

BACKGROUND OF THE INVENTION (1) Field of the Invention

The present invention relates to an information input/output system in which a user device inputs and outputs information to and from external sources.

(2) Description of the Related Art

Significant advancements in the area of multimedia-related technologies have been made in recent years, enabling the advent of large-capacity recording media, etc. With this as a background, systems have emerged for generating digital content composed of video, audio, and the like, and recording the digital content (hereafter, "content") on large-capacity recording media such as optical discs. In such systems, cryptographic technologies are employed to protect digital works, i.e, content. Also, one technique called "media bind", i.e., a technique for binding content to certain media, has been developed to prevent unauthorized copying of content.

As one specific example of this, a technique relating to a digital data protection system, a user approving device and a user device, is disclosed in the Japanese Patent No. 3073590. According to the disclosed technique, a digital data decryption key "A" is encrypted by using a media unique key "A" generated from unique information "A" recorded in a read-only area of a recording medium "A", and the encrypted digital data decryption key "A" is written to the recording medium "A" as approval information "A".

When the user intends to play back content on a device such as a personal computer (PC), the device is to first read the unique information "A" of the recording medium "A", generate the media unique key "A" from the read unique information "A", decrypt the approval information "A" by using the generated media unique key "A", and then decrypt encrypted content by using the digital data decryption key "A".

According to this technique, even if data recorded on the recording medium "A" is copied to another recording medium "B" using a PC or the like, unique information "B" recorded in a read-only area of the recording medium "B" cannot be rewritten to the unique information "A". Therefore, even if a media unique key "B" is generated from the unique information "B", the media unique key "B" fails to decrypt the approval information that has been generated by encryption using the media unique key "A", thereby failing to decrypt the encrypted content recorded on the recording medium "B".

According to the media bind technique, content to be recorded onto recording media can be bound to a certain medium in this way, and unauthorized copying of the content can be prevented.

Here, the following further describes the media bind technique by assuming the above device such as a PC to be made up of a drive (a read/write device) and a host (an encryption/decryption device).

According to the media bind technique, the host needs to be a licensed device as it encrypts and decrypts content, whereas the drive does not need to be a licensed device as it does not directly handle content.

The host and the drive are usually connected via a general-purpose bus whose specification is made public. The host and the drive are therefore susceptible to the following attack of "information replacement" by an unauthorized user.

As described above, the unique information "A", the encrypted content key "A" that has been encrypted by using the unique information "A", and the encrypted content "A" that has been encrypted by using the content key "A" are stored in the read-only area of the recording medium "A". As stated above, the encrypted content key "A" cannot be rewritten here. To decrypt the encrypted content "A", the content key "A" needs to be used. The content key "A" can be obtained only by decrypting the encrypted content key "A" by using the unique information "A".

Here, the unauthorized user may use his or her device (unauthorized device) to read the unique information "A", the encrypted content key "A", and the encrypted content "A" from the recording medium "A". The unauthorized device once internally stores the unique information "A" and the encrypted content key "A", and writes the encrypted content "A" to the other recording medium "B". The unique information "B" and the encrypted content key "B" encrypted by using the unique information "B" have been stored in the read-only area of this recording medium "B". The content key "B" can be obtained by decrypting the encrypted content key "B", but the content key "B" cannot be used to decrypt the encrypted content "A". At this point, the encrypted content "A" cannot be decrypted, and therefore cannot be played back.

Then, the unauthorized user connects the unauthorized device between the drive and the host. The unauthorized device receives the unique information "B", the encrypted content key "B", and the encrypted content "A" that the drive reads from the recording medium "B". Then, the unauthorized device replaces the received unique information "B" and the received encrypted content key "B" with the unique information "A" and the encrypted content key "A" that have been stored in the unauthorized device. Finally, the unauthorized device transmits the unique information "A" and the encrypted content key "A", together with the encrypted content "A" read from the recording medium "B", to the host. The host, which has received the unique information "A", the encrypted content key "A", and the encrypted content "A", can decrypt and play back the encrypted content "A" without any problems. This means that the unauthorized user has virtually succeeded in copying the content.

To prevent the above-described attack of information replacement, the host is required to verify the validity of a device transferring information thereto, by using a public key encryption method and the like. The essential condition for such verification using a public key is that the public key is a valid one.

To this end, it is common that an agency called a "certification authority" issues, for each device belonging to the system, a "public key certificate" asserting that a public key corresponding to the device is valid.

If a device for which a public key certificate has been issued is engaged in an unauthorized conduct, or if a secret key corresponding to the device is stolen, the certification authority revokes the corresponding public key certificate. To inform other devices belonging to the same system about devices whose certificates have been revoked, the certification authority issues a public key certificate revocation list (hereafter, a "CRL") with its digital signature being attached thereto. The CRL lists pieces of information specifying public key certificates that have been revoked. Based on the CRL, the host can judge whether or not a device transferring information thereto is valid. As one example, document (1)—"*Secure Electronic Commerce: Building the Infra structure for Digital Signatures and Encryption*" translated in Japanese by Shinichiro Yamada, published by PEARSON EDUCATION—discloses the construction of a CRL defined by X.

509 standard determined by the ISO/IEC/ITU. A problem, however, lies in the drive-host construction where the drive receives the CRL before the host receives the CRL. This means that even if the drive has been made invalid, the drive may transfer to the host an old CRL issued before the drive was made invalid, instead of the correct CRL to be used by the host to judge the validity of the drive. If this happens, the host may fail to correctly judge the validity of the drive.

SUMMARY OF THE INVENTION

In view of the above problems, the object of the present invention is to provide a system in which a host correctly judges whether a drive is a device that has been made invalid, for preventing the unauthorized copying of content.

The above object can be achieved by an information input/output system in which a user device inputs and outputs information to and from external sources, where one of the external sources is a key management device. The system includes the key management device, which is operable to securely output invalid-device information, where the invalid-device information specifies an invalid device unit that has been made invalid for use. The system also includes the user device that includes an input/output unit and a host unit. The input/output unit is operable to be enabled to input and output information between the host unit and the external sources. The host unit is operable to securely receive, via the input/output unit, the invalid-device information outputted by the key management device, and judge whether or not the input/output unit is an invalid device unit by referring to the received invalid-device information. When judging that the input/output unit is an invalid device, the host unit is operable to thereafter prohibit input and output via the input/output unit.

According to this construction, the host can judge correctly whether or not the drive is a device that has been made invalid.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DETAILED DESCRIPTION OF THE PREFERRED EMBODIMENT

The following describes a preferred embodiment of the present invention, with reference to the drawings.

1. Construction of Information Input/Output System 800

Figure 1:
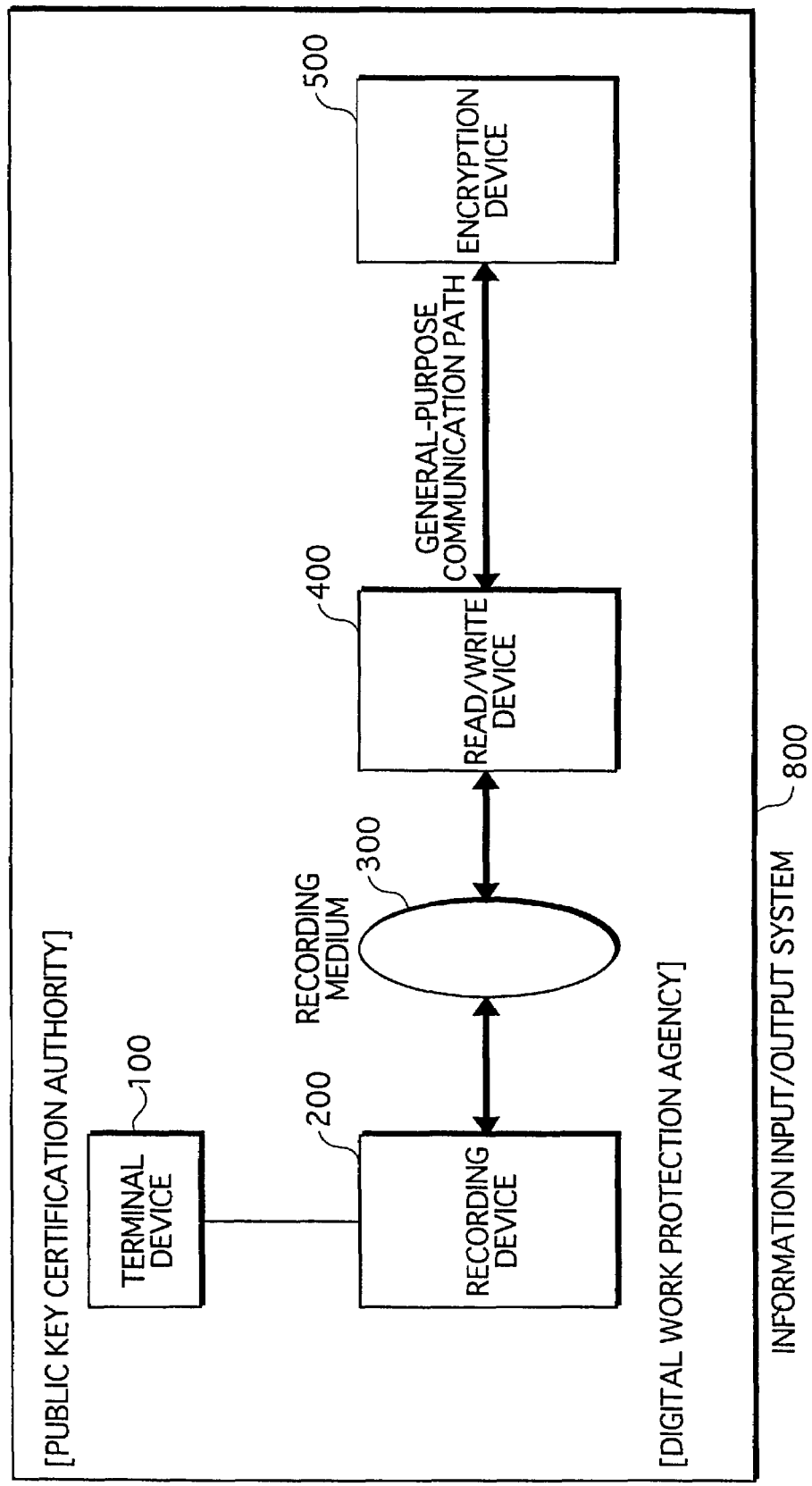
FIG. 1 is a block diagram showing the overall construction of an information input/output system 800.

As shown in FIG. 1, an information input/output system 800 is roughly composed of a terminal device 100, a recording device 200, a recording medium 300, a read/write device 400, and an encryption device 500.

The terminal device 100 is owned by a public key certification authority (hereafter, "CA"), which issues a public key certificate for each device belonging to the information input/output system 800, and a public key certificate revocation list (hereafter, "CRL"), which is described later. A public key certificate for each device asserts that the corresponding public key is valid. The terminal device 100 stores the public key certificates and the CRL.

Figure 3:
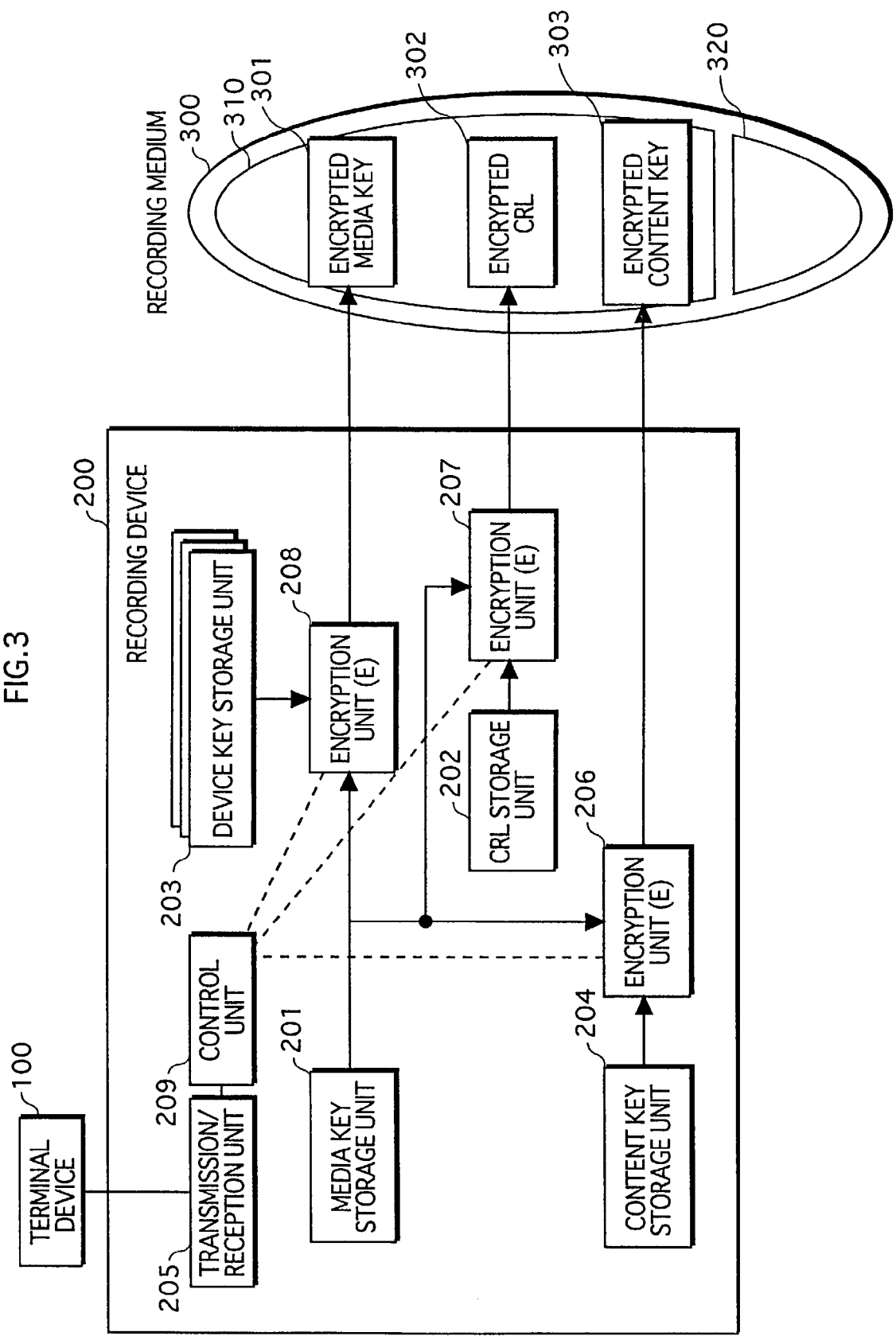
FIG. 3 is a block diagram showing the construction of a terminal device 100, a recording device 200, and a recording medium 300.

As shown in FIG. 3, the recording device 200 is owned by a digital work protection agency. The recording device 200 encrypts a key to be used for encrypting content and records the encrypted key onto the recording medium 300, for the purpose of allowing only a valid device to encrypt and write content onto the recording medium 300.

The recording medium 300 is made up of a recording area 310 and a recording area 320. The recording area 310 is an area for storing a key to be used to encrypt content. The recording area 320 is an area for storing encrypted content.

The read/write device 400 is allowed to use content, and reads and writes data to and from the recording medium 300.

The encryption device 500 is allowed to use content, decrypts an encrypted key to be used for encrypting content, and encrypts the content by using the decrypted key.

The terminal device 100 and the recording device 200 are connected via a network using SSL (secure sockets layer). The read/write device 400 and the encryption device 500 may be owned, for example, by a content provider. The read/write device 400 and the encryption device 500 may be connected via a general-purpose communication path. The general-purpose communication path referred to herein intends to mean an insecure communication path on which data can be freely changed or replaced.

The following describes the construction of each component of the information input/output system 800.

1.1 Terminal Device 100

The terminal device 100 stores the public key certificates and the CRL issued by the CA.

The public key certificates are issued in one-to-one correspondence with the devices belonging to the system, and each public key certificate asserts that the corresponding public key is valid. The public key certificate contains the following items: an expiration time of the certificate; a public key for the device; an ID unique to the device; and the CA's signature data for these items.

Among the public key certificates issued, a certificate that has not expired and that corresponds to a device engaged in an unauthorized conduct or a device whose secret key is stolen, is revoked. The CRL lists pieces of information specifying devices with such revoked public key certificates, for the purpose of informing the other devices belonging to the system that the listed devices have been made invalid.

Figure 2:
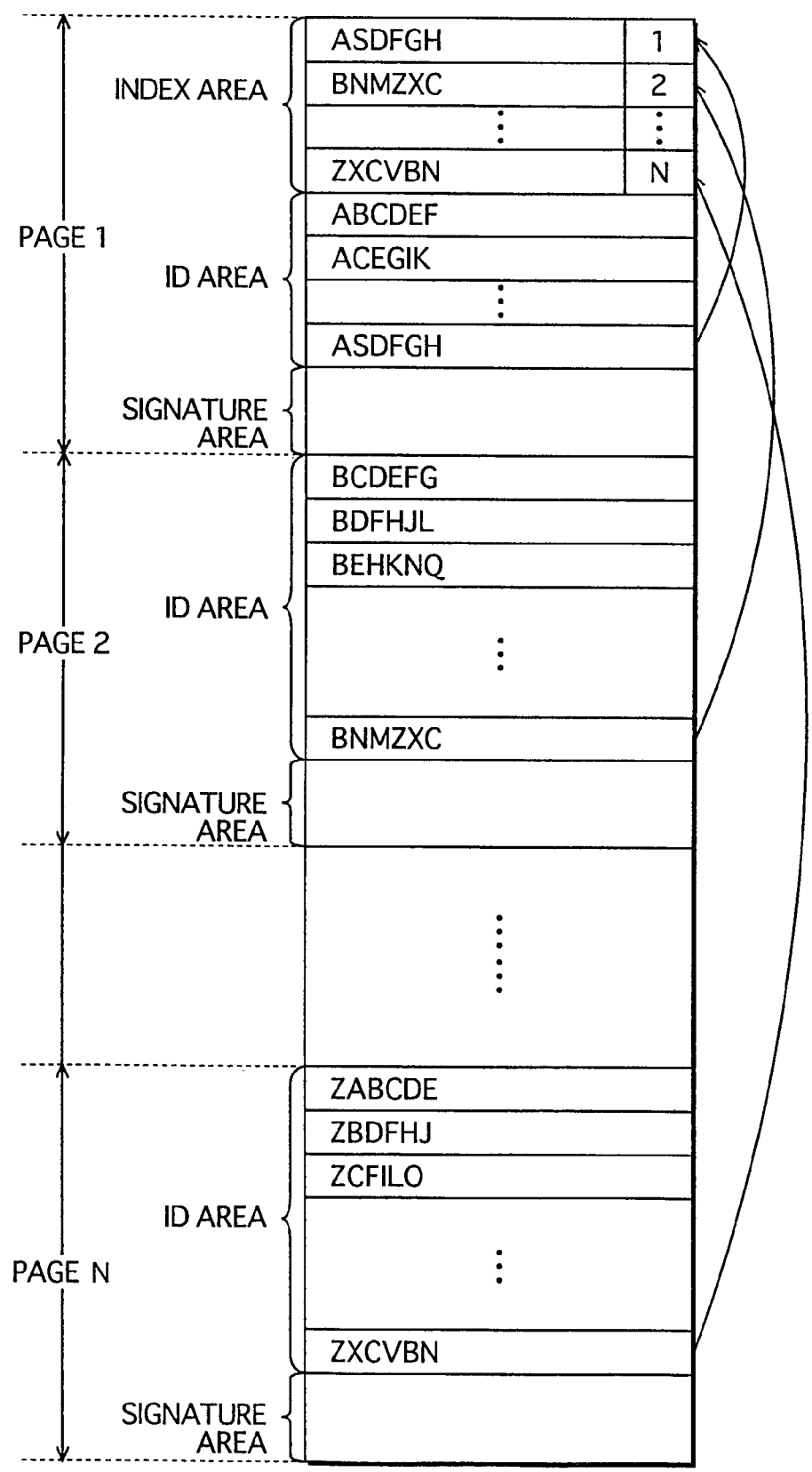
FIG. 2 shows the construction of a CRL.

As shown in FIG. 2, the CRL is composed of a plurality of pages. In FIG. 2, the CRL is assumed to be composed of pages 1 to N. Page 1 includes an index area, an ID area, and a signature area. Page 2 includes an ID area and a signature area. Page 3 and the following pages are the same as page 2. Each page is made up of such an amount of data that can be read by the read/write device 400 accessing one-time the recording medium 300.

In each page, the ID area stores, in an ascending order, IDs of devices having revoked public key certificates.

In each page, the signature area stores signature data generated by subjecting the IDs stored in the page to a signature algorithm "S". As one example, the signature algorithm "S" may be the ElGamal signature scheme over finite fields. The ElGamal signature scheme over finite fields is well known, and therefore is not described here.

In page 1, the index area stores IDs, each of which is a representative, of a different one of the pages and has the largest value among IDs stored in the ID area of its page.

1.2 Recording Device 200

As shown in FIG. 3, the recording device 200 includes a media key storage unit 201, a CRL storage unit 202, a device key storage unit 203, a content key storage unit 204, a transmission/reception unit 205, encryption units 206 to 208, and a control unit 209.

The following describes each component of the recording device 200.

(1) Media Key Storage Unit 201

The media key storage unit 201 stores a plurality of media keys. Each media key is used to encrypt a content key to be used for encrypting a CRL and content. The CA issues these media keys when the recording device 200 is valid.

(2) CRL Storage Unit 202

The CRL storage unit 202 obtains a CRL from the terminal device 100 via the transmission/reception unit 205, and stores the obtained CRL.

(3) Device Key Storage Unit 203

The device key storage unit 203 stores device keys of all encryption devices belonging to the information input/output system 800.

(4) Content Key Storage Unit 204

The content key storage unit 204 stores the content key used for encrypting the content.

(5) Encryption Unit 206

The encryption unit 206 reads the content key from the content key storage unit 204, and reads one media key from the media key storage unit 201. The encryption unit 206 then encrypts the read content key by using the read media key according to an encryption algorithm "E". As one example, the encryption algorithm "E" may be the DES (data encryption standard). The DES is well known, and therefore is not described here.

(6) Encryption Unit 207

The encryption unit 207 reads the CRL from the CRL storage unit 202, and reads a media key that is the same as the media key that has been used to encrypt the content key from the media key storage unit 201. Using the read media key, the encryption unit 207 encrypts each page of the entire CRL according to the encryption algorithm "E".

(7) Encryption Unit 208

The encryption unit 208 reads a media key that is the same as the media key that has been used to encrypt the CRL and the content key, from the media key storage unit 201. Also, the encryption unit 208 selects a device key of an encryption device that is allowed to use the content, and reads the selected device key from the device key storage unit 203.

Using the read device key, the encryption unit 208 encrypts the read media key according to the encryption algorithm "E".

It should be noted here that a method for selecting such a device key that can provide a media key only to a particular device can be realized by a well-known technique, and therefore is not described here. As one example, a copyright protection key management method using a tree structure is disclosed in document (2) "*Dejitaru Kontentsu HogoYo Kagi-Kanri Houshiki* (Key Management Method for Protecting Digital Content)" written by Nakano, Omori, and Tatebayashi in 2001 Symposium on Cryptography and Information Security (SCIS2001) 5A-5, January 2001.

(8) Control Unit 209

The control unit 209 regularly accesses, via the transmission/reception unit 205, the terminal device 100 to obtain the latest CRL issued by the CA, and stores the obtained CRL into the CRL storage unit 202.

When the recording medium 300 is loaded in the recording device 200, the control unit 209 controls the encryption unit 206 to encrypt the content key by using the media key. The control unit 209 then writes the encrypted content key 303 to the recording area 310.

Also, the control unit 209 controls the encryption unit 207 to encrypt each page of the entire CRL by using the media key. The control unit 209 then writes the encrypted CRL 302 to the recording area 310.

The control unit 209 controls the encryption unit 208 to encrypt the media key by using the device key, and writes 355, the encrypted media key 301 to the recording area 310.

1.3 Recording Medium 300

As shown in FIG. 3, the recording medium 300 includes the recording area 310 in which the encrypted media key 301, the encrypted CRL 302 and the encrypted content key 303 are to be recorded, and the recording area 320 in which encrypted content is to be recorded.

The recording area 310 is writable by the recording device 200. The recording area 310 is only readable but not writable by the read/write device 400.

The recording area 320 is writable by the read/write device 400.

1.4 Read/Write Device 400

Figure 4:
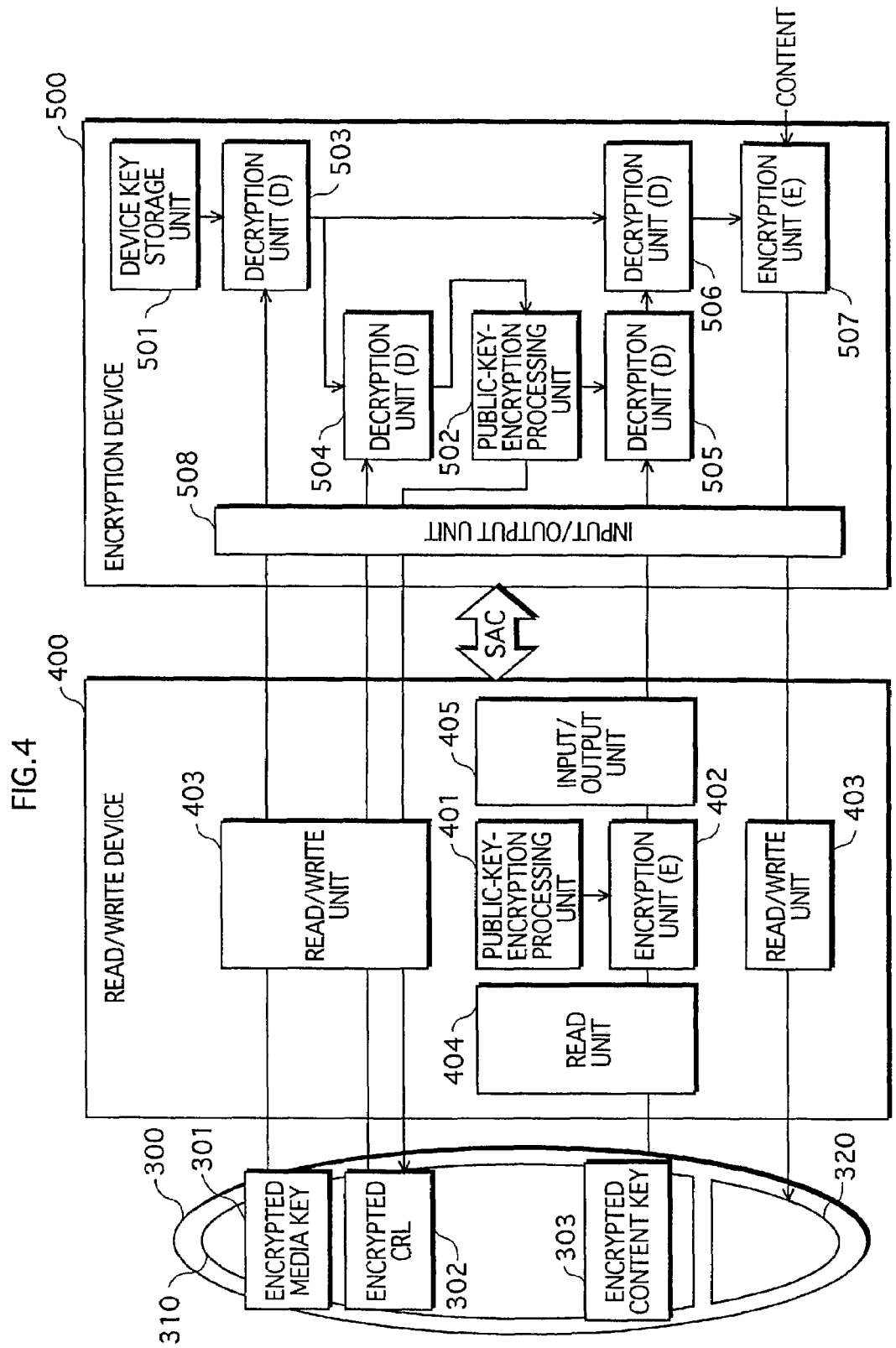
FIG. 4 is a block diagram showing the construction of the recording medium 300, a read/write device 400, and an encryption device 500.
Figure 5:
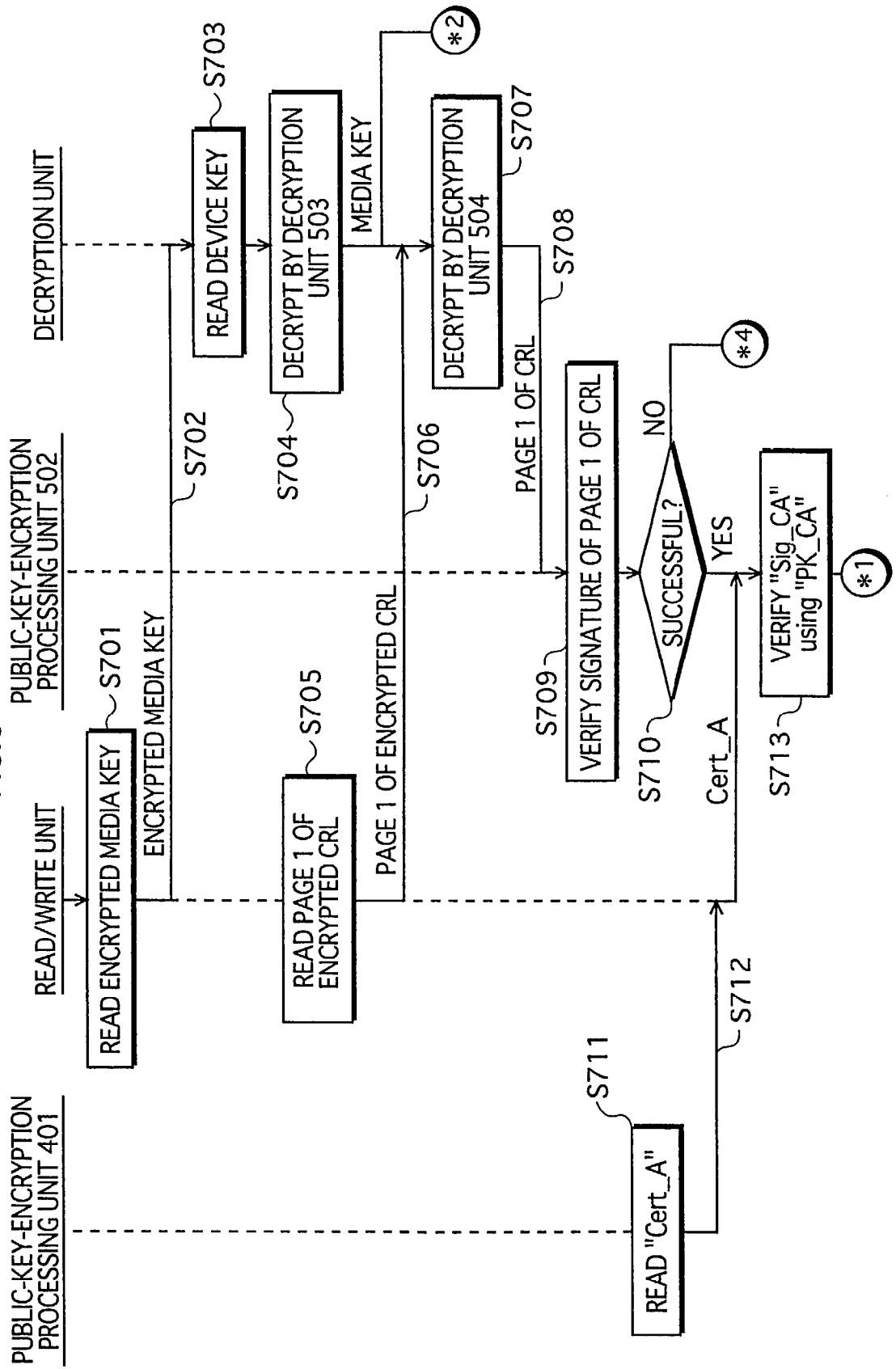
FIG. 5 is a flowchart showing the operations of the read/write device 400 and the encryption device 500, to be continued to FIG. 6.
Figure 6:
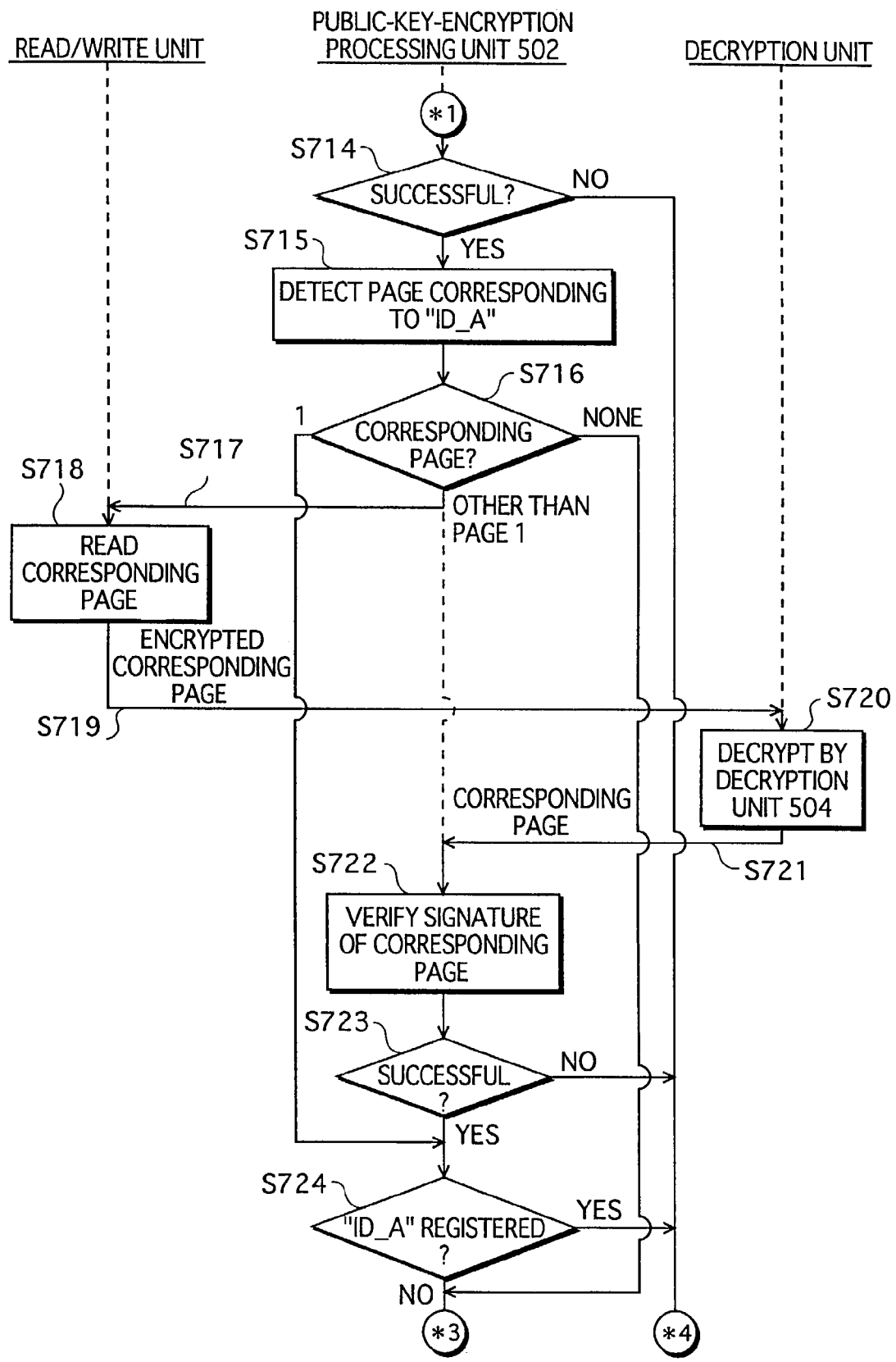
FIG. 6 is a flowchart showing the operations of the read/write device 400 and the encryption device 500, continued from FIG. 5 and to be continued to FIG. 7.

As shown in FIG. 4, the read/write device 400 includes a public-key-encryption processing unit 401, an encryption unit 402, a read/write unit 403, a read unit 404, and an input/output unit 405.

The following describes each component of the read/write device 400.

(1) Public-Key-Encryption Processing Unit 401

The public-key-encryption processing unit 401 establishes an SAC (secure authentication channel) between the read/write device 400 and the encryption device 500. Before establishing the SAC, the public-key-encryption processing unit 401 generates a shared key "Key_AB" that can be shared by the read/write device 400 and the encryption device 500. It should be noted here that "Gen" is set as a key generation function and "Y" is set as a system parameter unique to the system. It should also be noted that the key generation function "Gen" satisfies the relationship "Gen (x, Gen (y,z))=Gen (y, Gen (x,z))". It should be noted here that the key generation function can be realized by a freely chosen conventional technique, and therefore is not described in detail here. As one example, document (3)—"*Gendai Ango Riron* (Modern Cryptography), written by Nobuichi Ikeno and Kenji Koyama, Denki Tsushin Gakkai—discloses the Diffie-Hellman (DH) public key distribution method.

The public-key-encryption processing unit 401 stores a secret key "SK_A" of the read/write device 400, and a certificate "Cert_A" issued by the CA for the read/write device 400. The certificate "Cert_A" contains the following items: an expiration time of the certificate; a public key "PK_A" of the read/write device 400; and an ID "ID_A" of the read/write device 400, and the CA's signature data "Sig_CA" for these items.

The public-key-encryption processing unit 401 reads the certificate "Cert_A", and transmits the read certificate to the public-key-encryption processing unit 502 in the encryption device 500.

The public-key-encryption processing unit 401 receives a random number "Cha" from the public-key-encryption processing unit 502, and generates signature data "Sig_A" for the received random number "Cha" by using the secret key "SK_A". Then, the public-key-encryption processing unit 401 transmits the generated signature data "Sig_A" to the public-key-encryption processing unit 502.

The public-key-encryption processing unit 401 receives a key "Key_B" calculated by the public-key-encryption processing unit 502, and generates a random number "a". Then, the public-key-encryption processing unit 401 calculates a key "Key_A=Gen (a, Y)" by using the generated random number "a", and transmits the calculated key "Key_A" to the encryption device 500. Also, by using the received key "Key_B" and the calculated key "Key_A", the public-key-encryption processing unit 401 calculates a shared key "Key_AB=Gen (a, Key_B)" to be shared by the read/write device 400 and the encryption device 500. The public-key-encryption processing unit 401 outputs the calculated shared key "Key_AB" to the encryption unit 402.

(2) Encryption Unit 402

The encryption unit 402 receives the shared key "Key_AB" calculated by the public-key-encryption processing unit 401. Using the shared key "Key_AB", the encryption unit 402 encrypts the encrypted content key 303 that the read unit 404 reads from the recording area 310, according to the encryption algorithm "E". The resulting key obtained by encrypting the encrypted content key 303 by using the shared key is hereafter referred to as the "double-encrypted content key".

The encryption unit 402 outputs the double-encrypted content key 303 to the input/output unit 405.

(3) Read/Write Unit 403

The read/write unit 403 reads the encrypted media key 301 from the recording area 310, and transmits the encrypted media key 301 to the encryption device 500.

The read/write unit 403 reads page 1 of the encrypted CRL 302, and transmits the read page to the encryption device 500. Also, when the read/write unit 403 is instructed to read a page corresponding to the ID "ID_A" by the encryption device 500, the read/write unit 403 reads the corresponding page of the encrypted CRL 302 from the recording area 310, and transmits the read page to the encryption device 500.

The read/write unit 403 receives encrypted content from the encryption device 500, and writes the encrypted content to the recording area 320.

(4) Read Unit 404

The read unit 404 reads the encrypted content key 303 from the recording area 310, and outputs the encrypted content key 303 to the encryption unit 402.

(5) Input/Output Unit 405

The input/output unit 405 transmits the double-encrypted content key 303 encrypted by the encryption unit 402 to the encryption device 500.

1.5 Encryption Device 500

As shown in FIG. 4, the encryption device 500 includes a device key storage unit 501, a public-key-encryption processing unit 502, decryption units 503 to 506, an encryption unit 507, and an input/output unit 508.

The following describes each component of the encryption device 500.

(1) Device Key Storage Unit 501

The device key storage unit 501 stores a device key that is unique to the encryption device 500.

(2) Public-Key-Encryption Processing Unit 502

The public-key-encryption processing unit 502 establishes an SAC between the read/write device 400 and the encryption device 500. Before establishing the SAC, the public-key-encryption processing unit 502 generates a shared key "Key_AB" that can be shared by the read/write device 400 and the encryption device 500.

The public-key-encryption processing unit 502 stores a public key "PK_CA" of the CA.

The public-key-encryption processing unit 502 receives page 1 of the CRL from the decryption unit 504, and subjects signature data of the page 1 to a signature verification algorithm "V", to verify the signature. Here, the signature verification algorithm "V" is an algorithm for verifying signature data generated based on the above signature algorithm "S". When the verification is unsuccessful, the SAC establishment process ends.

When the verification is successful, the following processing is executed. The public-key-encryption processing unit 502 receives the certificate "Cert_A" from the public-key-encryption processing unit 401 via the input/output unit 508, and verifies the signature data "Sig_CA", by using the public key "PK_CA" of the CA. When the verification is unsuccessful, the SAC establishment process ends. When the verification is successful, the following processing is executed. The public-key-encryption processing unit 502 detects a page that may correspond to the ID "ID_A", from the index area of the page 1 received from the read/write device 400, and outputs the detected page. To detect the corresponding page, the public-key-encryption processing unit 502 checks the IDs arranged in the ascending order in the index area one after another from the top, and detects a page number written in a row containing an ID that has the same value as or a higher value than the ID "ID_A".

When the corresponding page is page 1, the public-key-encryption processing unit 502 judges whether or not the ID "ID_A" is registered in the ID area of the page 1. When the ID "ID_A" is registered therein, the SAC establishment process ends.

When the corresponding page is not page 1, the public-key-encryption processing unit 502 instructs the read/write device 400 to read the corresponding page.

Upon receipt of the page corresponding to the ID "ID_A" read by the read/write device 400 and decrypted by the decryption unit 504, the public-key-encryption processing unit 502 subjects signature data of the page to the signature verification algorithm "V", to verify the signature. When the verification is unsuccessful, the SAC establishment process ends. When the verification is successful, the following processing is executed. The public-key-encryption processing unit 502 judges whether or not the ID "ID_A" is registered in the page. When the ID "ID_A" is registered in the page, the SAC establishment process ends.

When failing to detect an ID having a larger value than the ID "ID_A" in the index area and failing to find the corresponding page, when detecting the corresponding page that is page 1 but the ID "ID_A" is not registered in page 1 of the CRL, or when detecting the corresponding page but detecting the ID "ID_A" is not registered in the corresponding page, the public-key-encryption processing unit 502 generates a random number "Cha", and transmits the generated random number to the public-key-encryption processing unit 401.

Upon receipt of the signature data "Sig_A" from the public-key-encryption processing unit 401, the public-key-encryption processing unit 502 verifies the signature data "Sig_A", by using the public key "PK_A" of the read/write device 400 received as being contained in the certificate "Cert_A".

When the verification is unsuccessful, the SAC establishment process ends.

When the verification is successful, the following processing is executed. The public-key-encryption processing unit 502 generates a random number "b". Using the generated random number "b", the public-key-encryption processing unit 502 calculates the key "Key_B=Gen (b, Y)", and transmits the calculated key "Key_B" to the public-key-encryption processing unit 401.

Upon receipt of the key "Key_A" calculated by the public-key-encryption processing unit 401, the public-key-encryption processing unit 502 calculates the shared key "Key_AB=Gen (b, Key_A)" by using the received key "Key_A" and the generated random number "b". The public-key-encryption processing unit 502 outputs the calculated shared key "Key_AB" to the decryption unit 505.

(3) Decryption Units 503 to 506

The decryption unit 503 receives the encrypted media key 301 from the read/write device 400 via the input/output unit 508, and reads a device key from the device key storage unit 501. Using the read device key, the decryption unit 503 decrypts the encrypted media key 301 according to a decryption algorithm "D". Here, the decryption algorithm "D" is an algorithm for executing processing inverse to the encryption algorithm "E", so as to decrypt the encrypted data. The decryption unit 503 outputs the media key to the decryption unit 504 and the decryption unit 506.

The decryption unit 504 receives the page 1 of the encrypted CRL 302 from the read/write device 400 via the input/output unit 508 and receives the media key outputted by the decryption unit 503. The decryption unit 504 then decrypts the page 1 of the encrypted CRL by using the received media key, according to the decryption algorithm "D". The decryption unit 504 outputs the CRL to the public-key-encryption processing unit 502. Also, upon receipt of the page of the encrypted CRL 302 corresponding to the ID "ID_A" via the input/output unit 508, the decryption unit 504 decrypts the corresponding page by using the media key according to the decryption algorithm "D", and outputs the CRL to the public-key-encryption processing unit 502.

The decryption unit 505 receives the double-encrypted content key 303 from the read/write device 400 via the input/output unit 508 and receives the shared key "Key_AB" generated by the public-key-encryption processing unit 502. Then, the decryption unit 505 decrypts the double-encrypted content key 303 by using the shared key "Key_AB", according to the decryption algorithm "D". The decryption unit 505 outputs the encrypted content key 303 to the decryption unit 506.

The decryption unit 506 receives the media key outputted by the decryption unit 503 and receives the encrypted content key 303 outputted by the decryption unit 505. Then, the decryption unit 506 decrypts the encrypted content key 303 by using the media key, according to the decryption algorithm "D". The decryption unit 506 then outputs the content key to the encryption unit 507.

(4) Encryption Unit 507

The encryption unit 507 receives the content key outputted by the decryption unit 506 and receives content from an external source, and encrypts the content by using the content key according to the encryption algorithm "E". The encryption unit 507 outputs the encrypted content to the input/output unit 508.

(5) Input/Output Unit 508

The input/output unit 508 receives the encrypted media key 301 from the read/write device 400, and outputs the encrypted media key 301 to the decryption unit 503.

The input/output unit 508 receives page 1 of the encrypted CRL 302 from the read/write device 400, and outputs the received page 1 to the decryption unit 504. Also, upon receipt of an instruction to read a page of the encrypted CRL 302 corresponding to the ID "ID_A" from the decryption unit 504, the input/output unit 508 transmits the instruction to the read/write device 400. The input/output unit 508 receives the corresponding page of the encrypted CRL 302 from the read/write device 400, and outputs the received corresponding page to the decryption unit 504.

The input/output unit 508 receives the double-encrypted content key 303 from the read/write device 400, and outputs the double-encrypted content key 303 to the decryption unit 505.

The input/output unit 508 receives the encrypted content from the encryption unit 507, and outputs the encrypted content to the read/write device 400.

2. Operation of the Information Input/Output System 800

2.1 Operation of the Recording Device 200

The following describes the operation of the recording device 200 to write data to the recording area 310 of the recording medium 300.

When the recording medium 300 is loaded in the recording device 200, the control unit 209 instructs the encryption unit 206 to encrypt the content key.

The encryption unit 206 reads the content key from the content key storage unit 204, and reads one media key from the media key storage unit 201. The encryption unit 206 encrypts the content key by using the read media key.

The control unit 209 writes the encrypted content key 303 encrypted by the encryption unit 206, to the recording area 310.

Following this, the control unit 209 instructs the encryption unit 207 to encrypt the CRL.

The encryption unit 207 reads the CRL from the CRL storage unit 202 and reads a media key that is the same as the media key that has been used to encrypt the content key from the media key storage unit 201. Using the read media key, the encryption unit 207 encrypts each page of the entire CRL.

The control unit 209 writes the encrypted CRL 302, each page of which has been encrypted by the encryption unit 207, to the recording area 310.

Also, the control unit 209 instructs the encryption unit 208 to encrypt the media key.

The encryption unit 208 selects a device key of an encryption device that is allowed to use the content, and reads the selected device key from the device key storage unit 203.

Then, the encryption unit 208 reads a media key that is the same as the media key that has been used to encrypt the content key and the CRL, from the media key storage unit 201. The encryption unit 208 encrypts the media key by using the device key.

The control unit 209 writes the encrypted media key 301 encrypted by the encryption unit 208, to the recording area 310.

2.2 Operations of the Read/Write Device 400 and the Encryption Device 500

The following describes the operations of the read/write device 400 and the encryption device 500, with reference to FIGS. 5 to 8.

When the recording medium 300 is loaded in the read/write device 400, the read/write unit 403 reads the encrypted media key 301 from the recording area 310 (step S701), and transmits the encrypted media key 301 to the encryption device 500 (step S702).

The decryption unit 503 receives the encrypted media key 301 via the input/output unit 508, and reads a device key from the device key storage unit 501 (step S703). Using the read device key, the decryption unit 503 decrypts the encrypted media key 301 (step S704), and outputs the resulting media key.

The read/write unit 403 reads page 1 of the encrypted CRL 302 (step S705), and transmits the read page 1 to the encryption device 500 (step S706).

The decryption unit 504 receives the page 1 of the encrypted CRL 302 via the input/output unit 508, and receives the media key outputted by the decryption unit 503. The decryption unit 504 then decrypts the page 1 of the encrypted CRL 302 by using the media key (step S707), and outputs the page 1 of the CRL to the public-key-encryption processing unit 502 (step S708).

The public-key-encryption processing unit 502 verifies signature data of the page 1 of the CRL by using the public key "PK_CA" of the CA (step S709). When the verification is unsuccessful ("NO" in step S710), the operation ends.

To establish the SAC, the public-key-encryption processing unit 401 reads a certificate "Cert_A" (step S711), and transmits the read certificate to the public-key-encryption processing unit 502 via the input/output unit 405 (step S712).

The public-key-encryption processing unit 502 receives the certificate "Cert_A" via the input/output unit 508, and then verifies the signature data "Sig_CA" of the received certificate "Cert_A" by using the public key "PK_CA" of the CA (step S713). When the verification is unsuccessful ("NO" in step S714), the SAC establishment process ends. When the verification is successful ("YES" in step S714), the public-key-encryption processing unit 502 detects a page, in the decrypted page 1 of the CRL, that may correspond to the ID "ID_A" of the received certificate "Cert_A" (step S715). Then, the public-key-encryption processing unit 502 judges whether or not the detected corresponding page is page 1 (step S716). When judging that the corresponding page is not page 1 ("OTHER THAN PAGE 1" in step S716), the public-key-encryption processing unit 502 instructs the read/write unit 400 to read the corresponding page, via the input/output unit 508 (step S717).

The read/write unit 403 reads the page corresponding to the ID "ID_A" from the encrypted CRL 302 as instructed by the encryption device 500 (step S718), and transmits the read page to the encryption device 500 (step S719).

The decryption unit 504 receives the page corresponding to the ID "ID_A" of the encrypted CRL 302 via the input/output unit 508, and decrypts the received page (step S720). The decryption unit 504 then outputs the decrypted CRL to the public-key-encryption processing unit 502 (step S721). The public-key-encryption processing unit 502 verifies signature data of the corresponding page of the CRL (step S722). When the verification is unsuccessful ("NO" in step S723), the operation ends. When the verification is successful ("YES" in step S723), and the page corresponding to the ID "ID_A" is page 1 ("1" in step S716), the public-key-encryption processing unit 502 judges whether or not the ID "ID_A" is registered in the CRL (step S724).

When the ID "ID_A" is registered therein ("YES" in step S724), the SAC establishment process ends. When the ID "ID_A" is not registered therein ("NO" in step S724), and no page corresponds to the ID "ID_A" ("NONE" in step S716), the public-key-encryption processing unit 502 generates a random number "Cha" (step S725), and transmits the generated random number to the public-key-encryption processing unit 401 via the input/output unit 508 (step S726).

The public-key-encryption processing unit 401 receives the random number "Cha" via the input/output unit 405, generates the signature data "Sig_A" for the received random number "Cha" by using the secret key "SK_A" (step S727), and transmits the generated signature data to the public-key-encryption processing unit 502 via the input/output unit 405 (step S728).

The public-key-encryption processing unit 502 receives the signature data "Sig_A" via the input/output unit 508, and verifies the signature data "Sig_A" by using the public key "PK_A" received as being contained in the certificate "Cert_A" in step S710 (step S729). The public-key-encryption processing unit 502 judges whether or not the verification is successful (step S730). When the verification is unsuccessful ("NO" in step S730), the SAC establishment process ends. When the verification is successful ("YES" in step S730), the public-key-encryption processing unit 502 generates a random number "b" (step S731). Using the generated random number "b", the public-key-encryption processing unit 502 calculates the key "Key_B=Gen (b, Y)" (step S732), and transmits the calculated key "Key_B" to the public-key-encryption processing unit 401 via the input/output unit 508 (step S733).

The public-key-encryption processing unit 401 receives the key "Key_B" via the input/output unit 405, and generates a random number "a" (step S734). Using the generated random number "a", the public-key-encryption processing unit 401 calculates the key "Key_A=Gen (a, Y)" (step S734), and transmits the calculated key "Key_A" to the public-key-encryption processing unit 502 via the input/output unit 405 (step S736). Also, using the received key "Key_B", the public-key-encryption processing unit 401 calculates the shared key "Key_AB=Gen (a, Key_B)" (step S737), and outputs the shared key to the encryption unit 402 (step S738).

The public-key-encryption processing unit 502, which has received the key "Key_A", calculates the shared key "Key_AB=Gen (b, Key_A)" by using the key "Key_A" and the random number "b" (step S739), and outputs the shared key "Key_AB" to the decryption unit 505 (step S740).

In this way, the public-key-encryption processing unit 502 and the public-key-encryption processing unit 401 generate the shared key to be shared by the read/write device 400 and the encryption device 500. This completes the SAC establishment process.

When the public-key-encryption processing unit 401 generates the shared key "Key_AB", the read/write device 400 reads the encrypted content key 303 from the recording area 310 via the read unit 404 (step S741), and transmits the encrypted content key 303 to the encryption unit 402 (step S742). The encryption unit 402 encrypts the encrypted content key 303 by using the shared key "Key_AB" received from the public-key-encryption processing unit 401 (step S743), and transmits the resulting double-encrypted content key 303 to the encryption device 500 via the input/output unit 405 (step S744).

The decryption unit 505 receives the shared key "Key_AB" outputted by the public-key-encryption processing unit 502, and receives the double-encrypted content key 303 from the read/write device 400 via the input/output unit 508. The decryption unit 505 then decrypts the double-encrypted content key 303 by using the shared key "Key_AB" (step S745), and outputs the resulting encrypted content key 303 to the decryption unit 506.

The decryption unit 506 receives the media key outputted by the decryption unit 503 and the encrypted content key 303 outputted by the decryption unit 505, decrypts the encrypted content key 303 by using the media key (step S746), and outputs the content key to the encryption unit 507 (step S747).

The encryption unit 507 receives the content key from the decryption unit 506, and receives content from an external source. The encryption unit 507 then encrypts the content by using the content key (step S748). The encryption unit 507 transmits the encrypted content to the read/write device 400 via the input/output unit 508 (step S749).

The read/write unit 403 receives the encrypted content via the input/output unit 405, and writes the encrypted content to the recording area 320 of the recording medium 300 (step S750).

3. Other Modifications

Although the present invention is described based on the above embodiment, it should be clear that the present invention is not limited to the above embodiment. For example, the following modifications are possible.

(1) The present invention may be realized by methods described in the above embodiment. Also, the present invention may be realized by a computer program executed on a computer for realizing these methods, or by a digital signal representing the computer program.

Also, the present invention may be realized by a computer-readable recording medium on which the computer program or the digital signal is recorded. Examples of the computer-readable recording medium include a flexible disk, a hard disk, a CD-ROM, an MO, a DVD, a DVD-ROM, a DVD-RAM, a BD (Blu-ray Disc), and a semiconductor memory. Also, the present invention may be realized by the computer program or the digital signal recorded on such recording media.

Further, the present invention may be realized by the computer program or the digital signal being transmitted via an electric communication line, a wired/wireless line, or a network such as the Internet.

Moreover, the present invention may be realized by a computer system including a microprocessor and a memory. The memory may store the computer program, and the microprocessor may operate in accordance with the computer program.

The computer program or the digital signal may be transferred as being recorded on the recording medium, or via the network and the like, so that the computer program or the digital signal may be executed by another independent computer system.

Figure 7:
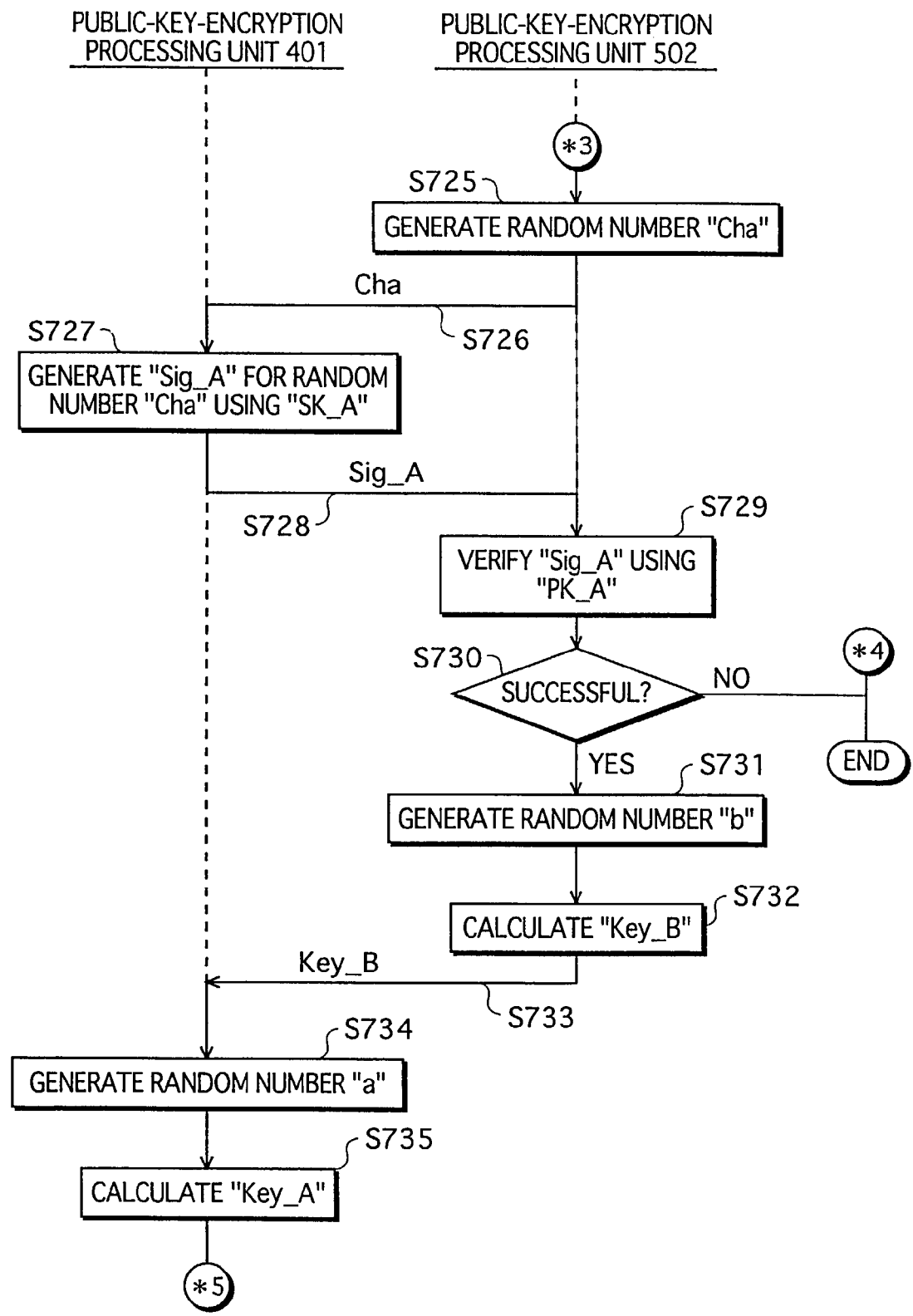
FIG. 7 is a flowchart showing the operations of the read/write device 400 and the encryption device 500, continued from FIG. 6 and to be continued to FIG. 8.
Figure 8:
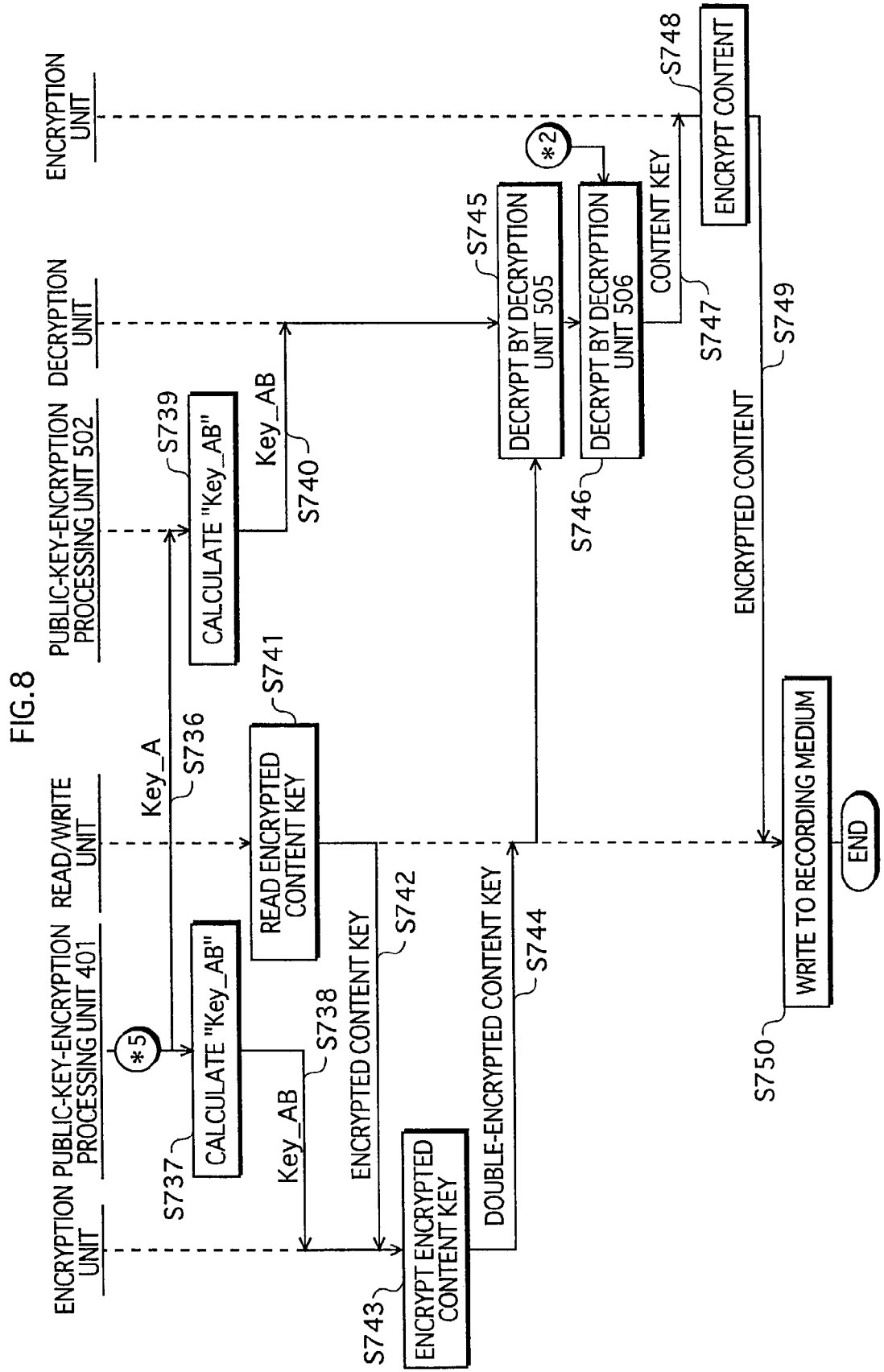
FIG. 8 is a flowchart showing the operations of the read/write device 400 and the encryption device 500, continued from FIG. 7.
Figure 9:
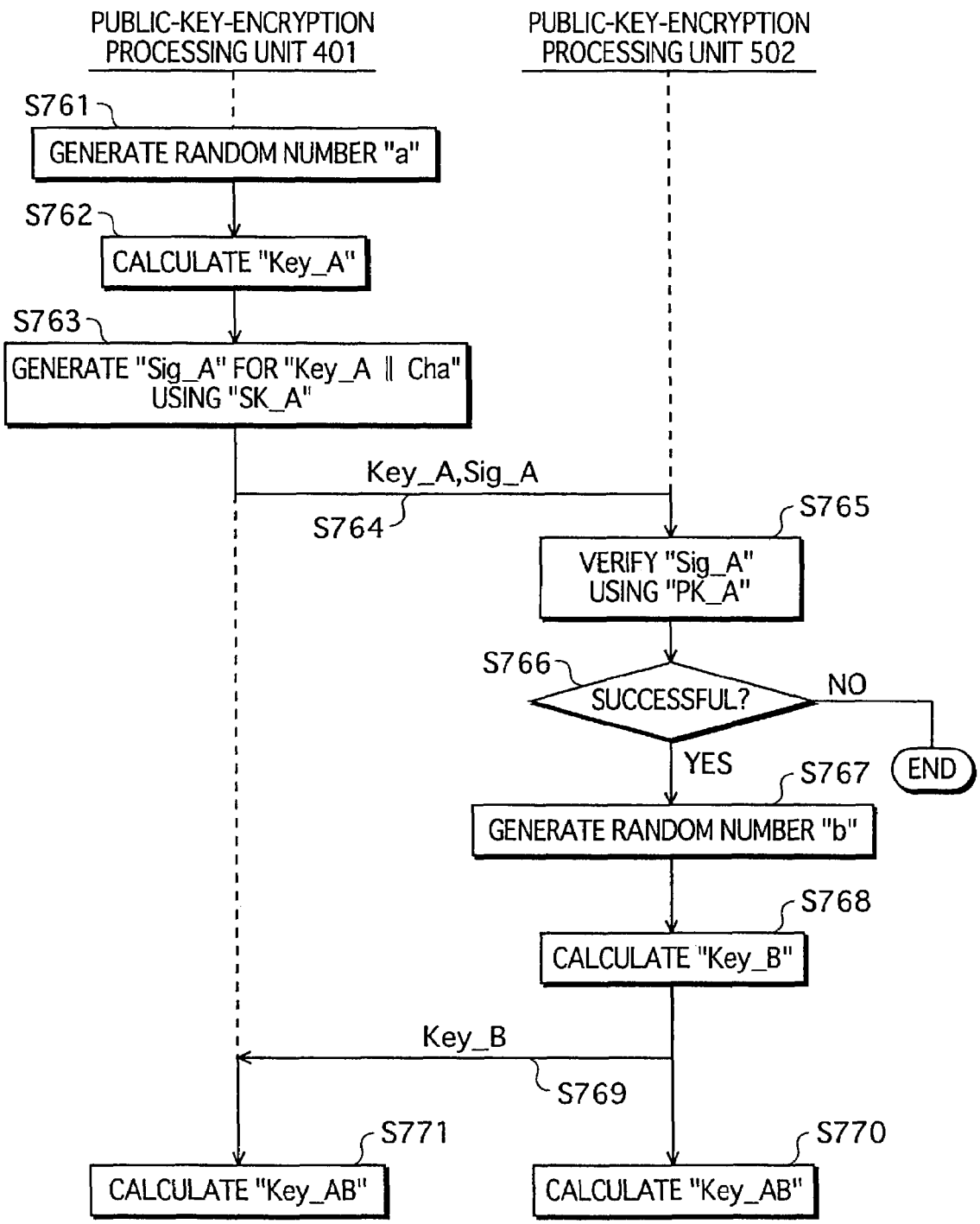
FIG. 9 is a flowchart showing the operations of the read/write device 400 and the encryption device 500.

(2) In the SAC establishment process, the shared key "Key_AB" may be generated via steps S761 to S771 shown in FIG. 9, instead of via steps S727 to S739 shown in FIGS. 7 and 8.

To be more specific, upon receipt of the random number "Cha", the public-key-encryption processing unit 401 generates a random number "a" (step S761). The public-key-encryption processing unit 401 calculates the key "Key_A=Gen (a, Y)", by using the generated random number "a" (step S762), and generates, by using the secret key "SK_A" of the read/write device 400, signature data "Sig_A" for "Key_A ||Cha" obtained by linking the calculated key "Key_A" and the received random number "Cha" (step S763). The public-key-encryption processing unit 401 then transmits the calculated key "Key_A" and the generated signature data "Sig_A" to the encryption device 500 (step S764).

The public-key-encryption processing unit 502 verifies the signature date "Sig_A" by using the public key "PK_A" of the read/write device 400 received as being contained in the certificate "Cert_A" (step S765). When the verification is unsuccessful ("NO" in step S766), the SAC establishment process ends. When the verification is successful ("YES" in step S766), the public-key-encryption processing unit 502 generates a random number "b" (step S767). Using the generated random number "b", the public-key-encryption processing unit 502 calculates the key "Key_B=Gen (b, Y)" (step S768), and transmits the calculated key "Key_B" to the public-key-encryption processing unit 401 (step S769). Also, by using the calculated key "Key_B" and the received key "Key_A", the public-key-encryption processing unit 502 calculates the shared key "Key_AB" (step S770).

Upon receipt of the key "Key_B", the public-key-encryption processing unit 401 calculates the shared key "Key_AB" by using the key "Key_B" and the key "Key_A" (step S771).

(3) Although the above embodiment describes such a hierarchical structure in which the content key is encrypted by using the media key and the media key is encrypted by using the device key, the present invention should not be limited thereto. For example, such a structure may be employed in which the content key is directly encrypted by using the device key and the CRL is encrypted by using the content key. In this case, the above-described attack of information replacement can be prevented by securely transmitting one of the content key and the device key on a general-purpose communication path.

Also, the hierarchical structure may be further complicated by increasing the number of keys used therein. As one example, a disc key may be additionally used. In this case, the content key is first encrypted by using the disc key, the disc key is encrypted by using the media key, and the media key is encrypted by using the device key. In this case, the CRL may not be encrypted by using the media key, but may be encrypted by using the disc key. In this way, any keys that can be securely obtained by the encryption device 500 may be used to encrypt the CRL.

Accordingly, the following construction may also be employed. The SAC for transmitting a public key may be established before the above pieces of information are transmitted. After the SAC is established, the above pieces of information may be securely transmitted and then eventually the validity of the public key may be verified by referring to the CRL.

(4) Although the above embodiment describes the case where IDs recorded in the index area each represent a different one of the pages and have the largest value among IDs recorded in the ID area of its page, the present invention should not be limited thereto. For example, IDs each having the smallest value among IDs recorded in the ID area of its page may be recorded in the index area, or both the smallest IDs and the largest IDs may be recorded in the index area.

Further, an address or identifier may be assigned to each page, and an address or identifier assigned to each page may be attached to IDs stored in the page. In this case, an address or identifier attached to an ID can be used to judge a page number of a page storing the ID.

Further, the above embodiment describes the case where signature data of each page of the CRL is recorded in the signature area of each page. Alternatively, the construction may be such that signature data of page 1 and page 2 is recorded in the signature area of page 2, and signature data of page 1 and page N is recorded in the signature area of page N. In this case, the signature data recorded in the signature area of page 1 does not need to be verified. For example, by verifying the signature data recorded in the signature area of page 2, the validity of the pages 1 and 2 can also be verified. In short, any construction may be employed in which the validity of a part of the CRL can be verified by using only the part of the read CRL. Also, signature data provided for the entire CRL may be received.

(5) Although the above embodiment describes the case where IDs of devices whose public key certificates have been revoked are recorded in the ID area of the CRL, the CRL may instead list serial numbers that are unique to the revoked public key certificates, or IDs of public keys corresponding to the devices.

In the case where the CRL lists the serial numbers, the encryption device 500 receives a public key certificate that contains its serial number, and the encrypted CRL from the read/write device 400. The encryption device 500 decrypts the encrypted CRL, and judges whether or not the serial number of the received public key certificate is listed in the decrypted CRL. When judging that the serial number is listed therein, the encryption device 500 judges that the public key certificate of the read/write device 400 has been revoked. The same manner is applied to the case where the CRL lists the IDs of public keys.

(6) Although the above embodiment describes the construction where the CRL is encrypted and then recorded on a recording medium, the present invention should not be limited thereto. Generally, the CRL is not required to be confidential, but the CRL is required to be valid. Accordingly, the CRL may have any construction that can ensure its validity. For example, the CRL may be subjected to a one-way conversion (e.g., a hash function) by using a media key, to generate a message authentication code (MAC). In this case, the media key, the CRL, and the MAC are recorded on a recording medium. Here, the encryption device 500 subjects the CRL to a one-way conversion by using a media key read from the recording medium, to generate a MAC. The encryption device 500 then compares the generated MAC and the read MAC, and judges that the CRL is valid when the MACs match.

(7) Although the above embodiment describes the case where the present invention is applied to the encryption device 500, the present invention may be applied to a decryption device, or an encryption/decryption device that has both encryption and decryption functions. In the case of a decryption device, the device reads and decrypts encrypted content recorded on a recording medium, and outputs the decrypted content.

(8) Although the above embodiment describes the case where a device key is unique to the encryption device 500, the same device key may be shared by a plurality of devices of the same type, or by a plurality of devices that handle the same type of content.

(9) Although the above embodiment describes the case where a key used for encrypting or decrypting content is a content key itself, another key generated from the content key or another key generated from the content key and other information (e.g., information unique to a recording medium) may be used to encrypt or decrypt the content.

(10) Although the above embodiment describes the case where the recording device 200 includes the CRL storage unit that stores the latest CRL, the encryption device, the decryption device, or the encryption/decryption device may include the CRL storage unit. In this case, the CRL storage unit compares the CRL received from the read/write device 400 and the CRL stored therein, to see which one is newer. When the received CRL is newer, the CRL storage device updates the CRL stored therein to the received CRL. Here, the CRLs may be compared based upon a version number of each CRL, or a creation date and time of each CRL. Also, the encryption device, the decryption device, or the encryption/decryption device may be connected to a network. In this case, the device may inquire about the latest CRL or obtain the latest CRL via the network only when detecting a difference between the CRL stored therein and the received CRL.

(11) The above embodiment describes the case where the SAC is established so as to require only one-way authentication, i.e., the authentication in which the encryption device 500 verifies the validity of the read/write device 400. However, the SAC may be established so as to require mutual authentication. In this case, the CRL used by the read/write device 400 may be recorded on the recording medium 300. Alternatively, the read/write device 400 may be constructed to include the CRL storage unit storing the latest CRL.

(12) The read/write device and the encryption device may not be separate devices. For example, the read/write device and the encryption device may be included in one apparatus and may be connected to each other therein via a general-purpose communication path.

(13) The construction utilizing a communication medium instead of the recording medium may be employed. In this case, the encryption device 500 receives the encrypted media key 301, the encrypted CRL 302, and the encrypted content key 303 from the recording device 200 via a communication medium such as a network, and performs decryption and authentication by performing the same operations as those described in the above embodiment. Then, the encryption device 500 encrypts content by using the decrypted content key, and transmits the encrypted content to a playback device such as a PC.

(14) Although the above embodiment describes the case where the CRL that the recording device 200 receives from the terminal device 100 is made up of a plurality of pages, the CRL received from the terminal device 100 may be made up of one page in which IDs of all devices whose public key certificates have been revoked are recorded. In this case, the recording device 200 divides the received CRL into a plurality of pages, and extracts an ID written at the end and/or start of each page, to generate an index area. The recording device 200 then signs at least a part of each page, and stores the CRL.

(15) Although the above embodiment describes the case where the terminal device 100 attaches the CA's signature to IDs contained in the CRL, the recording device 200 may instead attach the recording device 200's signature to IDs contained in the CRL.

(16) Although the above embodiment describes the case where the media key storage unit 201 stores a plurality of media keys, each media key may be generated within the recording device 200 every time when required. Also, each media key may be inputted into the recording device 200 from an external source every time when required.

(17) Although the above embodiment describes the case where the recording device 200 stores a media key and a content key, the present invention should not be limited thereto. The recording medium 300 may store unique information, and the recording device 200 may generate a media key and a content key by using the unique information. As one example, a media key may be generated by combining the unique information with information about a date and time. Alternatively, still another key may be generated by using the unique information. In this case, the media key may be encrypted by using the generated key, or the content key may be encrypted by using the generated key.

(18) Although the above embodiment describes the case where one media key is selected from a plurality of media keys, and the content key is encrypted by using the selected media key, the present invention should not be limited thereto.

The content key may be encrypted by using one media key. Alternatively, the content key may be encrypted by using a plurality of different media keys using a plurality of recording devices. For example, the content key may be encrypted by the recording device "A" by using the media key "A", and the same content key may be encrypted by the recording device "B" by using the media key "B". Further, the content key may be encrypted by using a larger number of media keys.

(19) Although the above embodiment describes the case where the encrypted media key, the encrypted CRL, and the encrypted content key are recorded in a read-only recording area that is not writable, the present invention should not be limited thereto.

As long as information which is unique to the recording medium is recorded in a read-only area that is not writable, other keys may be recorded in a writable area.

(20) Although the above embodiment describes the case where the encryption unit 207 encrypts the entire CRL, the encryption unit 207 may be constructed to encrypt only a part of the CRL, such as a signature area of each page of the CRL.

(21) Although the above embodiment describes the case where the recording device 200 encrypts the media key, the content key and the CRL, and writes them onto the recording area 310, a device for encrypting them and a device for writing them may be separately provided.

(22) The above embodiment and the modifications may be freely combined.

As described above, the present invention relates to an information input/output system in which a user device inputs and outputs information to and from external sources, where one of the external sources is a key management device. The system includes the key management device operable to securely output invalid-device information, where the invalid-device information specifies an invalid device unit that has been made invalid for use, and the user device that includes an input/output unit and a host unit. The input/output unit is operable to be enabled to input and output information between the host unit and the external sources. The host unit is operable to securely receive, via the input/output unit, the invalid-device information outputted by the key management device, and judge whether or not the input/output unit is an invalid device unit by referring to the received invalid-device information. When judging that the input/output unit is an invalid device, the host unit is operable to thereafter prohibit input and output via the input/output unit.

According to this construction, a CRL can be prevented from being tampered with, thereby enabling a correct judgment as to whether or not a device has been made invalid. Then, by excluding a device that is judged as being invalid, digital works can be protected.

Here, the key management device may be operable to encrypt the invalid-device information, and output the encrypted invalid-device information. Further, the host unit in the user device may be operable to receive the encrypted invalid-device information outputted by the key management device and decrypt the encrypted invalid-device information so as to obtain invalid-device information, and judge whether or not the input/output unit is an invalid device unit by referring to the obtained invalid-device information.

Also, the key management device may be operable to sign the invalid-device information so as to generate signature data, and output the invalid-device information and the signature data. Further, the host unit in the user device may be operable to receive the signature data and the invalid-device information, and verify the received signature data. When the verification is successful, the host unit may be operable to judge whether or not the input/output unit is an invalid device unit by referring to the received invalid-device information.

According to this construction, invalid-device information can be encrypted, and therefore, the invalid-device information can be prevented from being tampered with.

According to this construction, a signature can be attached to invalid-device information, so that the signature can verify that the invalid-device information is correct information to be used for verifying the validity of a device.

Here, the key management device and the user device may be connected to each other via a network. The key management device may be operable to output the invalid-device information to the user device via the network, and the user device may be operable to receive the invalid-device information via the network.

According to this construction, correct invalid-device information can be transmitted and received via a communication medium, thereby enabling a correct judgment as to whether or not the input/output unit has been made invalid.

Here, the key management device may be operable to write the invalid-device information to a recording area of a recording medium that is computer-readable and that is not writable by the user device. The user device may be operable to read the invalid-device information from the recording medium.

According to this construction, the host unit can receive correct invalid-device information from the recording medium.

The present invention also relates to a key management device that outputs invalid-device information including a storing unit operable to store invalid-device information specifying an invalid device unit that has been made invalid for use, and an outputting unit operable to securely output the invalid-device information.

According to this construction, invalid-device information can be outputted securely, and therefore, the invalid-device information can be prevented from being tampered with.

Here, the outputting unit may be operable to encrypt the invalid-device information, and output the encrypted invalid-device information.

Here, the outputting unit may be operable to encrypt the invalid-device information by using first key information, encrypt the first key information by using second key information, and output the encrypted invalid-device information and the encrypted first key information.

Here, the outputting unit may be operable to encrypt at least a part of the invalid-device information, and output the encrypted part of the invalid-device information and a remaining part of the invalid-device information.

Here, the outputting unit may be operable to sign the invalid-device information so as to generate signature data, and output the invalid-device information and the signature data.

Here, the outputting unit may be operable to subject the invalid-device information to a one-way conversion, so as to generate a message authentication code, and output the invalid-device information and the message authentication code.

Here, the outputting unit may be operable to (a) subject first key information and the invalid-device information to a one-way conversion, so as to generate a message authentication code, (b) encrypt the first key information by using second key information, and (c) output the message authentication code, the invalid-device information, and the encrypted first key information.

According to this construction, invalid-device information can be encrypted, or a message authentication code of invalid-device information can be generated and outputted. Therefore, the correctness of the invalid-device information can be verified, thereby preventing the invalid-device information from being tampered with.

Here, the key management device may further include: a first storing unit that stores a plurality of identifiers identifying invalid device units that have been made invalid for use; a second storing unit that has an index area and two or more page areas; a page generating unit operable to arrange the identifiers stored by the first storing unit in an order specified by a predetermined arrangement criterion, divide the arranged identifiers into two or more groups corresponding to the two or more page areas, and write the identifiers divided in the two or more groups into the corresponding page areas; an index area generating unit operable to write an identifier that is a representative of each page area into the index area; and a signing unit operable to sign the identifiers written in each page area, so as to generate signature data for each page area. The outputting unit may be operable to transmit the invalid-device information that is made up of the index area, the two or more page areas, and the signature data for each page area.

According to this construction, invalid-device information can be outputted while being divided into a plurality of pages. Then, by attaching a signature to each page, the invalid-device information can be prevented from being tampered with.

The present invention also relates to a computer-readable recording medium including a recording area that is not writable by a user device, and in which second key information and invalid-device information are recorded. The second key information is outputted by a key management device and is encrypted by using first key information that is unique to a device unit. The invalid-device information is securely outputted by the key management device by using the second key information and specifies an invalid device unit that has been made invalid for use.

According to this construction, the recording medium can store invalid-device information and second key information into its read-only area. Therefore, the invalid-device information can be prevented from being tampered with, and digital works can be protected.

The present invention also relates to a user device that inputs and outputs information to and from external sources, where one of the external sources is a key management device that securely outputs invalid-device information specifying an invalid device unit that has been made invalid for use. The user device includes an input/output unit and a host unit. The input output unit is operable to be enabled to input and output information between the host unit and the external sources. The host unit includes a receiving unit operable to securely receive, via the input/output unit, the invalid-device information outputted by the key management device, a judging unit operable to judge whether or not the input/output unit is an invalid device unit by referring to the received invalid-device information, and a prohibiting unit operable to prohibit input and output of information via the input/output unit, when the judging unit judges that the input/output unit is an invalid device.

According to this construction, the user device can securely receive invalid-device information, thereby enabling a correct judgment as to whether or not the input/output unit has been made invalid.

Here, the receiving unit may be operable to receive encrypted invalid-device information outputted by the key management device, and decrypt the encrypted invalid-device information, so as to obtain the invalid-device information. Further, the judging unit may be operable to judge whether or not the input/output unit is an invalid device unit by referring to the obtained invalid-device information.

Here, the receiving unit may include: a storing unit that stores second key information; an information receiving unit operable to receive, from the key management device, encrypted first key information that has been encrypted by using the second key information, and encrypted invalid-device information that has been encrypted by using the first key information; a first decrypting unit operable to decrypt the encrypted first key information by using the second key information, so as to obtain first key information; and a second decrypting unit operable to decrypt the encrypted invalid-device information by using the obtained first key information, so as to obtain the invalid-device information.

Here, the receiving unit may be operable to receive, from the key management device, signature data that has been generated by signing the invalid-device information, and verify the received signature data. Further, the judging unit may be operable to judge whether or not the input/output unit is an invalid device unit by referring to the received invalid-device information, when a verification result by the receiving unit is successful.

Here, the receiving unit may be operable to receive, from the key management device, a first message authentication code that has been generated by subjecting the invalid-device information to a one-way conversion, and the invalid-device information, and subject the received invalid-device information to the one-way conversion, so as to generate a second message authentication code. Further, the judging unit may be operable to compare the received first message authentication code and the generated second message authentication code, and judge whether or not the input/output unit is an invalid device unit by referring to the received invalid-device information, when the first message authentication code and the second message authentication code match.

Here, the receiving unit may include: a storing unit that stores second key information; an information receiving unit operable to receive, from the key management device, (a) a first message authentication code that has been generated by subjecting first key information and the invalid-device information to a one-way conversion, (b) the invalid-device information, and (c) encrypted first key information that has been encrypted by using the second key information; a decrypting unit operable to decrypt the encrypted first key information by using the second key information, so as to obtain the second key information; and a message authentication code generating unit operable to subject the obtained second key information and the received invalid-device information to the one-way conversion, so as to generate a second message authentication code.

According to this construction, the user device can receive encrypted invalid-device information, or a message authentication code of invalid-device information. Therefore, the correctness of the invalid-device information can be verified, thereby preventing the invalid-device information from being tampered with.

Here, the user device may input and output information to and from a portable recording medium. The recording medium may store at least invalid-device information specifying a plurality of invalid device units that have been made invalid for use. The invalid-device information may contain an index page, a plurality of identifier pages, and a plurality of pieces of signature data in one-to-one correspondence with the identifier pages. Each identifier page may include a plurality of identifiers identifying a plurality of invalid device units. Each piece of signature data may have been generated by digitally signing the identifiers included in the corresponding identifier page. Each index page may include pieces of index information in one-to-one correspondence with the identifier pages. Each piece of index information may contain an identifier that is a representative of the corresponding identifier page. The user device may include an input/output unit and a host unit. The input/output unit is operable to be enabled to input and output information between the host unit and the recording medium. The host unit includes: an index page receiving unit operable to receive, via the input/output unit, the index page from the recording medium; a page specifying unit operable to specify, by using the received index page, an identifier page including an identifier identifying the input/output unit; an identifier page receiving unit operable to receive, via the input/output unit, the specified identifier page and signature data attached to the identifiers included in the specified identifier page, from the recording medium; a signature verifying unit operable to verify the received signature data; a judging unit operable to judge whether or not the input/output unit is an invalid device unit by referring to the received identifier page, when a verification result by the signature verifying unit is successful; and a prohibiting unit operable to prohibit input and output of information via the input/output unit, when the judging unit judges that the input/output unit is an invalid device.

According to this construction, only necessary pages can be transmitted and received, and therefore, the communication fee between the input/output unit and the host unit can be reduced.

Here, the receiving unit in the host unit may include a storing unit that stores invalid-device information, and a comparing unit operable to, when the invalid-device information is received from the key management device, compare the received invalid-device information with the invalid-device information stored by the storing unit and judge which one is newer. In addition, the receiving unit in the host unit may also include a writing unit operable to write the received invalid-device information into the storing unit, when the received invalid-device information is newer than the stored invalid-device information.

According to this construction, the user device can store invalid-device information. Therefore, the user device is not required to receive and verify the correctness of invalid-device information every time when reading information. The user device is required to receive invalid-device information only when the invalid-device information is updated.

The present invention also relates to a certification authority device that issues invalid-device information specifying an invalid device unit that has been made invalid for use. The certification authority device includes a first storing unit that stores a plurality of identifiers identifying invalid device units that have been made invalid for use, a second storing unit that has an index area and two or more page areas, and a page generating unit operable to classify the identifiers stored by the first storing unit into two or more groups corresponding to the two or more page areas, according to a predetermined classification criterion, and write the identifiers classified in the two or more groups into the corresponding page areas. The certification authority device also includes an index area generating unit operable to write an identifier that is a representative of each page area into the index area, a signing unit operable to sign the identifiers written in each page area, so as to generate signature data for each page area, and a transmitting unit operable to transmit invalid-device information that is made up of the index area, the two or more page areas, and the signature data for each page area.

According to this construction, the certification authority device that is a terminal device owned by the CA can divide, in advance, invalid-device information into a plurality of pages, and attach the CA's signature to each page, so that the signature can verify the correctness of the invalid-device information.

What is claimed is:

1. An information input/output system, comprising:
   a recording medium that stores:
   (i) content encrypted using a media key,
   (ii) an encrypted media key generated by encrypting the media key using a device key,
   (iii) invalid-device information including identification information identifying one or more invalid input/output devices that have been made invalid for use, and
   (iv) verification data, which is generated through a one-way conversion that is dependent on at least the media key and the invalid-device information, such that predetermined verification processing performed on the verification data fails when either (a) the encrypted media key is tampered with or (b) the invalid-device information is tampered with;
   an input/output device that includes:
   a storing unit that stores identification information that identifies the input/output device,
   a read unit that reads the encrypted content, the encrypted media key, the invalid-device information, and the verification data from the recording medium, and
   a transmission unit that transmits the encrypted content, the encrypted media key, the invalid-device information, the identification information of the input/output device, and the verification data; and
   a host device that includes:
   a storage unit that stores the device key,
   a receiving unit that receives the encrypted content, the encrypted media key, the invalid-device information, the identification information of the input/output device and the verification data from the input/output device,
   a verification unit that performs, through the one-way conversion that is dependent on at least the media key and the invalid-device information, the predetermined verification processing on the verification data in order to verify that neither the received encrypted media key nor the received invalid-device information has been tampered with;
   a confirmation unit that, when the verification unit succeeds in the predetermined verification processing, confirms whether or not the input/output device has been made invalid by checking whether or not the received identification information of the input/output device is included in the received invalid-device information, a first decryption unit that decrypts the encrypted media key, using the device key, and a second decryption unit that decrypts the encrypted content using the media key when (i) the verification unit succeeds in the predetermined verification processing; and (ii) the confirmation unit confirms that the input/output device has not been made invalid.

2. A host device that uses content read from a recording medium via an input/output device, wherein the recording medium stores:

(i) content encrypted using a media key,
(ii) an encrypted a media key generated by encrypting the media key using a device key,
(iii) invalid-device information including identification information identifying one or more invalid input/output devices that have been made invalid for use, and
(iv) verification data, which is generated through a one-way conversion that is dependent on at least the media key and the invalid-device information, such that predetermined verification processing performed on the verification data fails when either (a) the encrypted media key is tampered with or (b) the invalid-device information is tampered with, the host device comprising:

a storage unit that stores the device key;

a receiving unit that receives the encrypted content, the encrypted media key, the invalid-device information, the identification information of the input/output device and the verification data from the input/output device;

a verification unit that performs, through the one-way conversion that is dependent on at least the media key and the invalid-device information, the predetermined verification processing on the verification data in order to verify that neither the received encrypted media key nor the received invalid-device information has been tampered with;

a confirmation unit that, when the verification unit succeeds in the predetermined verification processing, confirms whether or not the input/output device has been made invalid by checking whether or not the received identification information of the input/output device is included in the received invalid-device information;

a first decryption unit that decrypts the encrypted media key, using the device key; and a second decryption unit that decrypts the encrypted content using the media key when (i) the verification unit succeeds in the predetermined verification processing; and (ii) the confirmation unit confirms that the input/output device has not been made invalid.

3. A method for a host device for storing a device key and using content read from a recording medium via an input/output device, wherein the recording medium stores:

(i) content encrypted using a media key,
(ii) an encrypted media key generated by encrypting the media key using the device key,
(iii) invalid-device information including identification information identifying one or more invalid input/output devices that have been made invalid for use, and
(iv) verification data, which is generated though a one-way conversion that is dependent on at least the media key and the invalid-device information, such that predetermined verification processing performed on the verification data fails when either (a) the encrypted media key is tampered with or (b) the invalid-device information is tampered with, the method comprising:

a receiving step of receiving the encrypted content, the encrypted media key, the invalid-device information, the identification information of the input/output device and the verification data from the input/output device;

a verification step of (i) performing, through the one-way conversion that is dependent on at least the media key and the invalid-device information, the predetermined verification processing on the verification data in order to verify that neither the received encrypted media key nor the received invalid-device information has been tampered with;

a confirmation step of confirming that, when the verification step succeeds in the predetermined verification processing, confirms whether or not the input/output device has been made invalid by checking whether or not the received identification information of the input/output device is included in the received invalid-device information;

a first decryption step of decrypting the encrypted media key, using the device key; and a second decryption step of decrypting the encrypted content using the media key when (i) the verification step succeeds in the predetermined verification processing; and (ii) the confirmation step confirms that the input/output device has not been made invalid.

4. A computer-readable recording medium that stores an executable computer program used by a host device configured to store a device key and uses content read from a content recording medium via an input/output device, wherein the computer-readable recording medium is configured to store:

(i) content encrypted using a media key,
(ii) an encrypted media key generated by encrypting the media key using the device key,
(iii) invalid-device information including identification information identifying one or more invalid input/output devices that have been made invalid for use, and
(iv) verification data, which is generated through a one-way conversion that is dependent on at least the media key and the invalid-device information, such that predetermined verification processing performed on the verification data fails when either (a) the encrypted media key is tampered with or (b) the invalid-device information is tampered with, the computer program when executed causes the host device to perform the following steps:

a receiving step of receiving the encrypted content, the encrypted media key, the invalid-device information, the identification information of the input/output device and the verification data from the input/output device;

a verification step of (i) performing, through the one-way conversion that is dependent on at least the media key and the invalid-device information, the predetermined verification processing on the verification data in order to verify that neither the received encrypted media key nor the invalid-device information has been tampered with;

a confirmation step of confirming that, when the verification step succeeds in the predetermined verification processing, confirms whether or not the input/output device has been made invalid by checking whether or not the received identification information of the input/output device is included in the received invalid-device information, a first decryption step of decrypting the encrypted media key, using the device key; and a second decryption step of decrypting the encrypted content using the media key when (i) the verification steps succeeds in the predetermined verification processing; and (ii) the confirmation step confirms that the input/output device has not been made invalid.

5. An integrated circuit device that uses content read from a recording medium via an input/output device, wherein the recording medium stores:

(i) content encrypted using a media key, (ii) an encrypted media key generated by encrypting the media key using a device key, (iii) invalid-device information including identification information identifying one or more invalid input/output devices that have been made invalid for use, and (iv) verification data, which is generated through a one-way conversion that is dependent on at least the media key and the invalid-device information, such that predetermined verification processing performed on the verification data fails when either (a) the encrypted media key is tampered with or (b) the invalid-device information is tampered with; and the integrated circuit device comprising:

a storage unit that stores the device key;

a receiving unit that receives the encrypted content, the encrypted media key, the invalid-device information, the identification information of the input/output device and the verification data from the input/output device;

a verification unit that performs, through the one-way conversion that is dependent on at least the media key and the invalid-device information, the predetermined verification processing on the verification data in order to verify that neither the received encrypted media key nor the received invalid-device information has been tampered with;

a confirmation unit that, when the verification unit succeeds in the predetermined verification processing, confirms whether or not the input/output device has been made invalid by checking whether or not the received identification information of the input/output device is included in the received invalid-device information a first decryption unit that decrypts the encrypted media key, using the device key; and a second decryption unit that decrypts the encrypted content using the media key when (i) the verification unit succeeds in the predetermined verification processing; and (ii) the confirmation unit confirms that the input/output device has not been made invalid.

* * * * *

UNITED STATES PATENT AND TRADEMARK OFFICE
CERTIFICATE OF CORRECTION

PATENT NO. : 7,647,646 B2
APPLICATION NO. : 10/414002
DATED : January 12, 2010
INVENTOR(S) : Toshihisa Nakano et al.

It is certified that error appears in the above-identified patent and that said Letters Patent is hereby corrected as shown below:

On the Title Page

Item (75) Inventors: "Neyagawa (JP)" should read --Neyagawa-shi (JP)--.

Item (75) Inventors: "Hirakata (JP)" should read --Hirakata-shi (JP)--.

Item (75) Inventors: "Takarazuka (JP)" should read --Takarazuka-shi (JP)--.

Item (75) Inventors: "Katano (JP)" should read --Katano-shi (JP)--.

Signed and Sealed this

Twenty-fifth Day of May, 2010

David J. Kappos
*Director of the United States Patent and Trademark Office*